(12) United States Patent
Reif et al.

(10) Patent No.: US 7,737,193 B2
(45) Date of Patent: *Jun. 15, 2010

(54) HYDROGENATED NITRILE RUBBER WITH NARROW MOLECULAR WEIGHT DISTRIBUTION, A PROCESS FOR ITS PREPARATION AND A METHOD OF USE

(75) Inventors: Lothar Reif, Dormagen (DE); Stephen Pask, Dormagen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 254 days.

This patent is subject to a terminal disclaimer.

(21) Appl. No.: 11/636,837

(22) Filed: Dec. 11, 2006

(65) Prior Publication Data

US 2007/0142564 A1    Jun. 21, 2007

(30) Foreign Application Priority Data

Dec. 21, 2005    (DE) .................... 10 2005 061 628

(51) Int. Cl.
*C08C 19/08* (2006.01)
*C08J 3/28* (2006.01)

(52) U.S. Cl. .................... 522/151; 521/40.5; 521/41; 528/480; 528/481; 528/502 R; 528/502 F

(58) Field of Classification Search ............ 528/480, 528/481, 502 R, 502 F; 521/40.5, 41; 522/151
See application file for complete search history.

(56) References Cited

U.S. PATENT DOCUMENTS

| | | | |
|---|---|---|---|
| 3,700,637 A | 10/1972 | Finch, Jr. et al. ............ 260/83.3 |
| 4,464,515 A | 8/1984 | Rempel et al. ............... 525/338 |
| 4,503,196 A | 3/1985 | Rempel et al. ............... 525/338 |
| 4,581,417 A | 4/1986 | Buding et al. ................ 525/338 |
| 4,631,315 A | 12/1986 | Buding et al. ................ 525/338 |
| 4,746,707 A | 5/1988 | Fiedler et al. ................ 525/338 |
| 4,795,788 A | 1/1989 | Himmler et al. ............. 525/338 |
| 4,978,771 A | 12/1990 | Fiedler et al. ................ 558/459 |
| 5,258,413 A | 11/1993 | Isayev ......................... 521/45.5 |
| 5,284,625 A * | 2/1994 | Isayev et al. ................. 422/128 |
| 6,683,136 B2 | 1/2004 | Guo et al. ................... 525/329.3 |
| 2003/0088035 A1 | 5/2003 | Guerin et al. ................ 525/509 |
| 2007/0049700 A1 | 3/2007 | Obrecht et al. ............ 525/329.1 |

FOREIGN PATENT DOCUMENTS

| | | |
|---|---|---|
| DE | 25 39 132 | 4/1987 |
| EP | 298 386 | 1/1989 |
| EP | 471 250 | 2/1992 |
| WO | 02/100905 | 12/2002 |
| WO | 02/100941 | 12/2002 |

OTHER PUBLICATIONS

"The Polymeric Materials Encyclopedia", CRC Press, Inc. 1996, V.V. Korshak, "Metathesis Polymerization, Cycloolefins", p. 12.
"Applied Sonochemistry", Editors: T.J. Mason, J.P. Lorimer, Wiley-VCH Verlag, Weinheim, 2002, pp. 161-162.
Suslick K. S.; Price, G. J.; "Applications of Ultrasound to Materials Chemistry" Annual Review of Materials Science, Annual Reviews Inc.; Jan. 1999, Bd. 29, pp. 295-326 XP-000986784.
European Search Report dated Sep. 4, 2009, EP application 06025543.

* cited by examiner

*Primary Examiner*—Roberto Rábago
(74) *Attorney, Agent, or Firm*—Jennifer R. Seng

(57) ABSTRACT

A novel process produces a novel hydrogenated nitrile rubber (B) which features a very narrow molecular weight distribution and a correspondingly low value for the polydispersity index. The preparation process encompasses the treatment of a hydrogenated nitrile rubber (A) with ultrasound, whereupon the resultant hydrogenated nitrile rubber (B) has a lower weight-average molecular weight ($M_w$) than the hydrogenated nitrile rubber (A). The resultant hydrogenated nitrile rubber (B) has excellent suitability for the production of mouldings via processing by extrusion processes or by injection-moulding processes.

11 Claims, No Drawings

HYDROGENATED NITRILE RUBBER WITH NARROW MOLECULAR WEIGHT DISTRIBUTION, A PROCESS FOR ITS PREPARATION AND A METHOD OF USE

FIELD OF THE INVENTION

The invention relates to a hydrogenated nitrile rubber with narrow molecular weight distribution, to a process for its preparation via treatment of a hydrogenated nitrile rubber with ultrasound, and also to a method of producing mouldings on the basis of said resultant hydrogenated nitrile rubber.

BACKGROUND OF THE INVENTION

Hydrogenated nitrile rubber, also known by the abbreviated term HNBR, is prepared via hydrogenation of nitrile rubber, also known by the abbreviated term NBR.

Nitrile rubbers, also known by the abbreviated term NBR, are rubbers which are copolymers composed of at least one unsaturated nitrile and of at least one conjugated diene and possibly of other comonomers.

Hydrogenated nitrile rubber is a specialty rubber which has very good heat resistance, excellent resistance to ozone and chemicals, and also exceptional oil resistance.

The abovementioned physical and chemical properties of HNBR are associated with very good mechanical properties, in particular with high abrasion resistance. For this reason, HNBR is now widely used in a very wide variety of application sectors. HNBR is used, for example, for gaskets, hoses and damping elements in the automobile sector, and also for stators, borehole seals and valve seals in the oil extraction sector, and also for numerous electrical-industry components, mechanical-engineering components and shipbuilding components.

Marketed HNBR grades have a Mooney viscosity (ML 1+4 @ 100° C.) in the range from 55 to 105, corresponding to a weight-average molecular weight $M_w$ (determined by: gel permeation chromatography (GPC) against polystyrene equivalents) in the range from about 200 000 to 500 000. The polydispersity indices D found here ($D=M_w/M_n$, where $M_w$ is the weight-average molecular weight and $M_n$ is the number-average molecular weight) indicate the breadth of molecular weight distribution and are greater than 3.0. The residue double bond content is moreover in the range from 1 to 18% (determined via IR spectroscopy).

The relatively high Mooney viscosity places severe restrictions on the processability of HNBR. Many applications would ideally use an HNBR grade whose molecular weight is lower and whose Mooney viscosity is therefore lower. This would give a decisive improvement in processability.

In the past, numerous attempts have been made to shorten the chain length of HNBR via degradation. One possibility is mechanical degradation via what is known as mastication, e.g. on a roll mill. Another possibility is chemical degradation, e.g. via reaction with strong acids. However, a disadvantage of this chemical degradation is that functional groups such as carboxylic acid groups and ester groups are incorporated into the molecule, and there is moreover a substantial change in the microstructure of the polymer. All of these changes have attendant disadvantages for the material's applications.

Using the methods currently predominant in standard production processes it is impossible or very difficult to prepare an HNBR with a Mooney viscosity (ML 1+4 @ 100° C.) smaller than 55 and which therefore has improved processability. The familiar preparation process for HNBR is hydrogenation of NBR. This hydrogenation normally increases the Mooney viscosity of the polymer by a factor of 2 or more, the function, inter alia, of the NBR grade used and of the degree of hydrogenation. This means that the viscosity range of marketed HNBR is limited via the lower limit of the Mooney viscosity of the starting material NBR, which nowadays is at values somewhat below 30 MU.

WO-A-02/100941 and WO-A-02/100905 represent the closest prior art. WO-A-02/100905 describes a process which encompasses the degradation of nitrile rubber starting polymers via olefin metathesis and subsequent hydrogenation. In this process, a nitrile rubber is reacted in a first step in the presence of a co-olefin and of a specific complex catalyst based on osmium, on ruthenium, on molybdenum or on tungsten, and in a second step is hydrogenated. According to WO-A-02/100941, hydrogenated nitrile rubbers with a weight-average molecular weight ($M_w$) in the range from 30 000 to 250 000 and with a Mooney viscosity (ML 1+4 @ 100° C.) in the range from 3 to 50 and with a polydispersity index D smaller than 2.5 are obtainable by way of this process. The resultant HNBR degradation products therefore feature a broad range of possible molecular weights, and also a molecular weight distribution which is relatively narrow in relation to the starting polymer. However, a disadvantage of this metathesis reaction is that it is necessary to use a catalyst which requires complicated preparation and is expensive. Another disadvantage is the fact that the breadth of molecular weight distribution or the polydispersity index has a lower limit by virtue of the nature of the chemical degradation of the molecular weight. In the olefin metathesis, a random chain degradation takes place and leads to a polydispersity of at least 2.0. In "The Polymeric Materials Encyclopedia", CRC Press, Inc. 1996, V. V. Korshak, "Metathesis polymerization, Cycloolefins", page 12 says, for example, that a polydispersity index of from 2.01 to 2.23 is achieved via metathesis degradation of unsaturated carbon polymer chains. Values smaller than 2.01 must therefore be values distorted via the measurement errors of the test method.

Starting from the prior art, the object of the present invention consisted in providing a process which can prepare a hydrogenated nitrile rubber which has narrower molecular weight distribution or respectively a smaller polydispersity index than the hydrogenated nitrile rubbers of WO-A-02/100941 previously disclosed and at the same time also has low values for the weight-average molecular weight.

SUMMARY OF THE INVENTION

Surprisingly, it has been found that the molecular weight of hydrogenated nitrile rubbers can be degraded advantageously via the effect of ultrasound and that this route can provide hydrogenated nitrile rubbers of reduced molecular weight which have markedly narrower molecular weight distribution and therefore a smaller polydispersity index than the low-molecular-weight hydrogenated nitrile rubbers of WO-A-02/100941 and of WO-A-02/100905 prepared by the combined metathesis/hydrogenation process.

DETAILED DESCRIPTION OF THE INVENTION

The present invention therefore provides a process for preparation of a hydrogenated nitrile rubber (B), wherein a hydrogenated nitrile rubber (A) is exposed to the effect of ultrasound, whereupon the resultant hydrogenated nitrile rubber (B) has lower weight-average molecular weight $M_w$ than the hydrogenated nitrile rubber (A).

For the purposes of this application, hydrogenated nitrile rubbers (HNBR) are co- or terpolymers which contain repeating units of at least one conjugated diene, of at least one α,β-unsaturated nitrile and, if appropriate, of one or more copolymerizable monomers, and in which the C═C double bonds of the diene units incorporated into the polymer have been hydrogenated entirely or to some extent. The degree of hydrogenation of the diene units incorporated into the polymer is usually in the range from 50 to 100%, preferably in the range from 85 to 100% and particularly preferably in the range from 95 to 100%.

The conjugated diene can be of any type. It is preferable to use $C_4$-$C_6$ conjugated dienes. Particular preference is given to 1,3-butadiene, isoprene, 2,3-dimethylbutadiene, piperylene or a mixture thereof. Particular preference is given to 1,3-butadiene and isoprene or a mixture thereof. 1,3-butadiene is very particularly preferred.

The α,β-unsaturated nitrile used can comprise any known (α,β-unsaturated nitrile, and preference is given to $C_3$-$C_5$ α,β-unsaturated nitriles, such as acrylonitrile, methacrylonitrile, ethacrylonitrile or a mixture of these. Acrylonitrile is particularly preferred.

Particularly preferred hydrogenated nitrile rubber is provided by a hydrogenated copolymer based on the monomers acrylonitrile and 1,3-butadiene.

Alongside the conjugated diene and the α,β-unsaturated nitrile, it is also possible to use one or more other monomers known to the person skilled in the art, examples being α,β-unsaturated mono- or dicarboxylic acids, or their esters or amides. Preferred α,β-unsaturated mono- or dicarboxylic acids here are fumaric acid, maleic acid, acrylic acid and methacrylic acid. Preferred esters used of the α,β-unsaturated carboxylic acids are their alkyl esters and alkoxyalkyl esters. Particularly preferred esters of the α,β-unsaturated carboxylic acids are methyl acrylate, ethyl acrylate, butyl acrylate, butyl methacrylate, 2-ethylhexyl acrylate, 2-ethylhexyl methacrylate and octyl acrylate.

The proportions of conjugated diene and of α,β-unsaturated nitrile in the HNBR polymers to be used can vary widely. The proportion of the conjugated diene or of the entirety of the conjugated dienes is usually in the range from 40 to 90% by weight and preferably in the range from 55 to 75%, based on the entire polymer. The proportion of the α,β-unsaturated nitrile or of the entirety of the α,β-unsaturated nitriles is usually from 10 to 60% by weight, preferably from 25 to 45% by weight, based on the entire polymer. The proportions of the monomers in each case give a total of 100% by weight. The amounts that can be present of the additional monomers are from 0.1 to 40% by weight, preferably from 1 to 30% by weight, based on the entire polymer. In this case, corresponding proportions of the conjugated diene(s) and, respectively, of the α,β-unsaturated nitrile(s) are replaced via the proportions of the additional monomers, and the proportions of all of the monomers here in each case give a total of 100% by weight.

The preparation of the nitrile rubbers via polymerization of the abovementioned monomers is well known to the person skilled in the art and is extensively described in the literature (e.g. Houben-Weyl, Methoden der Organischen Chemie [Methods of organic chemistry], Vol. 14/1, Georg Thieme Verlag Stuttgart 1961).

The hydrogenation of the nitrile rubbers described above to give hydrogenated nitrile rubber (A) can take place in the manner known to the person skilled in the art. By way of example, a suitable method is reaction with hydrogen with use of homogeneous catalysts, e.g. the catalyst known as "Wilkinson" catalyst ($(PPh_3)_3RhCl$) or others. Processes for the hydrogenation of nitrile rubber are known. Rhodium or titanium are usually used as catalysts, but platinum, iridium, palladium, rhenium, ruthenium, osmium, cobalt or copper can also be used either in the form of metal or else preferably in the form of metal compounds (see, for example, U.S. Pat. No. 3,700,637, DE-PS-2 539 132, EP-A-134 023, DE-A-35 41 689, DE-A-35 40 918, EP-A-298 386, DE-A-35 29 252, DE-A-34 33 392, U.S. Pat. No. 4,464,515 and U.S. Pat. No. 4,503,196).

Suitable catalysts and solvents for homogeneous-phase hydrogenation are described below and are also disclosed in DE-A-25 39 132 and EP-A-0 471 250.

Selective hydrogenation can be achieved, for example, in the presence of a rhodium-containing catalyst. By way of example, a catalyst of the general formula

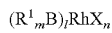

can be used, in which $R^1$ are identical or different and are a $C_1$-$C_8$-alkyl group, a $C_4$-$C_8$-cycloalkyl group, a $C_6$-$C_{15}$-aryl group or a $C_7$-$C_{15}$-aralkyl group, B is phosphorus, arsenic, sulphur or a sulphoxide group S═O, X is hydrogen or an anion, preferably halogen and particularly preferably chlorine or bromine, l is 2, 3 or 4, m is 2 or 3 and n is 1, 2 or 3, preferably 1 or 3.

Preferred catalysts are tris(triphenylphosphine)rhodium (I) chloride, tris(triphenylphosphine) rhodium (III) chloride and tris(dimethyl sulphoxide)rhodium (III) chloride, and also tetrakis(triphenylphosphine)rhodium hydride of the formula $(C_6H_5)_3P)_4RhH$ and the corresponding compounds in which the triphenylphosphine has been entirely or to some extent replaced by tricyclohexylphosphine. Small amounts of the catalyst can be used. A suitable amount is in the range from 0.01 to 1% by weight, preferably in the range from 0.03 to 0.5% by weight and particularly preferably in the range from 0.1 to 0.3% by weight, based on the weight of the polymer.

It is usually advisable to use the catalyst together with a co-catalyst which is a ligand of the formula $R^1_m B$, where $R^1$, m and B are as defined above for the catalyst. m is preferably equal to 3, B is preferably equal to phosphorus, and the radicals $R^1$ can be identical or different. The co-catalysts preferably have trialkyl, tricycloalkyl, triaryl, triaralkyl, diarylmonoalkyl, diarylmonocycloalkyl, dialkylmonoaryl, dialkylmonocycloalkyl or dicycloalkylmonoaryl radicals.

Suitable co-catalysts are found by way of example in U.S. Pat. No. 4,631,315. Triphenylphosphine is preferred co-catalyst. The amounts used of the co-catalyst are preferably from 0.3 to 5% by weight, preferably in the range from 0.5 to 4% by weight, based on the weight of the nitrile rubber to be hydrogenated. The ratio by weight of the rhodium-containing catalysts to the co-catalyst is moreover preferably in the range from 1:3 to 1:55, preferably in the range from 1:5 to 1:45. A suitable method uses from 0.1 to 33 parts by weight of the co-catalyst, preferably from 0.5 to 20 parts by weight and very particularly preferably from 1 to 5 parts by weight, in particular more than 2 but less than 5 parts by weight, of co-catalyst, based on 100 parts by weight of the nitrile rubber to be hydrogenated.

The practical method for this hydrogenation is well known to the person skilled in the art from U.S. Pat. No. 6,683,136. In the usual method, the nitrile rubber to be hydrogenated is treated with hydrogen in a solvent such as toluene or monochlorobenzene at a temperature in the range from 100 to 150° C. and at a pressure in the range from 50 to 150 bar for from 2 to 10 h.

For the purposes of this invention, hydrogenation is a reaction of the C=C double bonds present in the starting nitrile rubber, the extent of this reaction usually being at least 50%, preferably at least 75%, and particularly preferably at least 85%, based on the double bonds present in the starting nitrile rubber.

The hydrogenated nitrile rubber (A) which are used as starting material in the inventive process usually have a weight-average molecular weight $M_w$ in the range from 200 000 to 1 000 000, preferably in the range from 200 000 to 400 000 and particularly preferably in the range from 200 000 to 300 000. They moreover have a polydispersity index $D=M_w/M_n$, where $M_w$ is the weight-average molecular weight and $M_n$ is the number-average molecular weight, in the range from 1.9 to 6.0, preferably in the range from 2.2 to 5.0 and in particular in the range from 2.5 to 4.0.

The Mooney viscosity of the hydrogenated nitrile rubbers (A) used in the inventive process (ML 1+4 @ 100° C.) is in the range from 50 to 130, preferably from 55 to 75. The Mooney viscosity is determined here to ASTM standard D1646.

The inventive effect of ultrasound is the input of sonic energy with a frequency of at least 18 kHz, preferably in the range from 18 to 30 kHz and in particular in the range from 19 to 25 kHz.

The input of the energy here is a function of the frequency irradiated. The higher the frequency, the lower the energy input. "High-energy ultrasound" is the term used at frequencies up to 100 kHz. Very particular preference is given here to the use of ultrasound with a frequency in the region of 20 kHz.

The input of the energy takes place via immersion of a sonotrode into a solution, in a solvent, of the hydrogenated nitrile rubber (A) to be treated.

A batchwise method or else a continuous method can be used to carry out the inventive process.

In the case of a batchwise method, i.e. a batch procedure, operations are carried out in a stirred or non-stirred reactor.

It is also possible to achieve the energy input in a continuous procedure. In this, by way of example, a CSTR-type continuous-flow reactor (continuous stirred tank reactor) can be used, with a single pass or plurality of passes in a circulation procedure. It is also possible to use a plurality of CSTRs arranged one after the other in series to carry out the inventive process. A continuous-flow tubular reactor is equally suitable with use of an appropriate number of sonotrodes.

The effect of the ultrasound on the hydrogenated nitrile rubbers (A) takes place in solution. The molecular chains here are cleaved via application of mechanical forces (see also "Applied Sonochemistry", Editors: T. J. Mason, J. P. Lorimer, Wiley-VCH Verlag, Weinheim, 2002, pages 161-162). The high shear forces which lead to the cleavage of the molecular chains arise via cavitation. This is the term used for the production and sudden collapse of gas bubbles in a liquid.

The solvents used can comprise any solvents suitable for HNBR, examples being dichloromethane, benzene, toluene, cyclohexane or monochlorobenzene. Monochlorobenzene is preferred.

The only limit on the concentration of the hydrogenated nitrile rubber (A) in the solvent is the resultant viscosity of the solution. However, it has been found that degradation of molecular weight proceeds more effectively as the concentration becomes lower, other conditions being identical. Operations usually use an initial concentration of from 0.5 to 15% by weight, preferably from 1.0 to 7.5% by weight, of the hydrogenated nitrile rubber (A) in the solvent.

Input of the ultrasound energy is possible within a wide range of temperature and pressure. The inventive process is usually carried out at a temperature in the range from −30 to 100° C. It has been found that low temperatures have a favourable effect on the chain-degradation reaction. The inventive process is therefore preferably carried out at temperatures in the range from −20 to 50° C.

The inventive process is usually carried out in a pressure range from 1 to 5 bar.

In the inventive process it is also possible, of course, to use mixtures of various hydrogenated nitrile rubbers (A) and to expose them to ultrasound treatment. A mixture of hydrogenated nitrile rubbers (B) is then accordingly obtained.

A feature of the hydrogenated nitrile rubbers (B) obtained in the inventive process is particularly narrow molecular weight distribution and a correspondingly low value for the polydispersity index. Hydrogenated nitrile rubbers having this property profile were hitherto unknown and unobtainable.

The invention therefore provides hydrogenated nitrile rubbers which have a polydispersity index $D=M_w/M_n$ which is smaller than or equal to 2, preferably smaller than 2, particularly preferably smaller than 1.9 and very particularly preferably smaller than 1.7. In particular, D is greater than 1 and smaller than 2.0, and D is particularly preferably greater than 1 and smaller than 1.9.

The hydrogenated nitrile rubbers (B) obtained in the inventive process have lower weight-average molecular weight $M_w$ than the hydrogenated nitrile rubbers (A) used. The weight-average molecular weight $M_w$ of the hydrogenated nitrile rubbers (B) is usually in the range from 30 000 to 250 000, preferably in the range from 30 000 to 150 000 and in particular preferably in the range from 30 000 to 100 000.

The Mooney viscosity of the hydrogenated nitrile rubbers (B) obtained in the inventive process (ML 1+4 @ 100° C.) is in the range from 1 to 50, preferably in the range from 10 to 40. The Mooney viscosity is determined here to ASTM standard D1646.

Surprisingly, this ultrasound-treatment route is successful for the first time in providing hydrogenated nitrile rubbers which have an extremely narrow molecular weight distribution. It appears that the cleavage of the chemical bonds in the hydrogenated nitrile rubber used via the mechanical cleavage process does not, unlike in chemical bond cleavage, proceed randomly, i.e. that not all of the bonds in the polymer chain are equally "reactive".

The inventive hydrogenated nitrile rubbers having low molecular weight and narrow molecular weight distribution have very good processability.

The invention therefore also provides a method for producing mouldings comprising subjecting the novel hydrogenated nitrile rubber to an extrusion process or to an injection-moulding process.

The invention further provides mouldings which are produced from the inventive hydrogenated nitrile rubbers having very narrow molecular weight distribution and, respectively, correspondingly low polydispersity index. The methods that can be used for this by way of example, such as injection-moulding processes or extrusion processes, and also the corresponding injection-moulding apparatus or extruders, are well known to the person skilled in the art. When producing these mouldings it is also possible to add, to the inventive hydrogenated nitrile rubbers, the familiar auxiliaries which are known to the person skilled in the art and which are to be selected by that person in a suitable manner using conventional technical knowledge, examples being fillers, filler activators, accelerators, crosslinking agents, ozone stabilizers, antioxidants, processing oils, extender oils, plasticizers, activators or inhibitors to prevent premature vulcanization.

Examples of products preferably produced from the inventive hydrogenated nitrile rubbers are gaskets, hoses, damping elements, stators or cable sheathing.

EXAMPLES

The progress of the chain-degradation reaction is determined via gel permeation chromatography (GPC). A modulus system was used with Shodex RI-71 differential refractometer, S 5200 autosampler (SFD), column oven (ERC-125), Shimadzu LC 10 AT pump and a column combination composed of 3 mixed-B columns from Polymer Labs. Tetrahydrofuran was used as solvent and the resultant molecular weights are based on polystyrene standards from PSS (Mainz). No separate calibration for HNBR was carried out.

The molecular parameters such as number-average molecular weight ($M_n$), weight-average molecular weight ($M_w$) and the polydispersity index D resulting from these are determined from the RI signal using "Millennium" software from Waters.

Example 1

Batch Procedure 160 g of a solution of 1% by weight of HNBR (Therban® 3446 (Lanxess Deutschland GmbH), Mooney viscosity (ML 1+4 @ 100° C.) of 60 MU (determined to ASTM standard D1646), acrylonitrile content 34% by weight, residue double bond content (determined via IR spectroscopy) 4%) in monochlorobenzene were irradiated with ultrasound in a stainless steel reactor with thermostatic control at 30° C. over a period of 3 h.

The source used for the sonic energy was UIP 1000 equipment from Dr Hielscher, (maximum power 1000 watt, frequency 20 kHz, BS34 sonotrode with diameter 34 mm composed of titanium, variable amplitude). The amplitude selected was 50% of maximum power.

The specimens taken at regular intervals were characterized by means of GPC with respect to the molecular parameters. The results are shown in Table 1.

TABLE 1

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 68 000 | 126 000 | 1.9 |
| 2 | 61 000 | 104 000 | 1.7 |
| 3 | 56 000 | 91 000 | 1.6 |

Example 2

Batch Procedure

Using starting materials and conditions identical with those in Example 1, the temperature was lowered by means of cryostat to 0° C. The results are shown in Table 2.

TABLE 2

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 67 000 | 116 000 | 1.7 |
| 2 | 59 000 | 93 000 | 1.6 |
| 3 | 55 000 | 81 000 | 1.5 |

Examples 3-5

Batch Procedure

Apparatus settings identical with those of Example 1 were used at a sonic irradiation temperature of 40° C. on a solution of strength 1% by weight (Example 3), 3% by weight (Example 4) and 5% by weight (Example 5) of Therban®3446. The results are shown in Tables 3-5 below.

TABLE 3

Concentration of Therban ® 3446: 1% by weight

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 70 500 | 137 000 | 1.9 |
| 2 | 65 700 | 113 500 | 1.7 |
| 3 | 64 400 | 101 000 | 1.6 |

TABLE 4

Concentration of Therban ® 3446: 3% by weight

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 80 000 | 162 000 | 2.0 |
| 2 | 76 000 | 140 000 | 1.8 |
| 3 | 74 000 | 125 000 | 1.7 |

TABLE 5

Concentration of Therban ® 3446: 5% by weight

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 79 000 | 182 000 | 2.3 |
| 2 | 81 000 | 166 000 | 2.1 |
| 3 | 76 000 | 151 000 | 2.0 |

Example 6

Circulation Procedure

With apparatus settings the same as those in Example 1, and using a sonic irradiation temperature of 30° C., a solution of 1% by weight of Therban®3446 was pumped from a feed vessel through a continuous-flow reactor and returned to the feed vessel. The volume of the feed vessel here was four times the volume of the reaction space. The pump-circulation velocity was selected in such a way as to give single-pass average residence time of 0.25 h in the reaction space. Specimens were taken from the feed vessel at regular time intervals and the progress of the degradation reaction was checked by means of GPC. The results are shown in Table 6.

TABLE 6

| Sonic irradiation time (h) | Number-average $M_n$ | Weight-average $M_w$ | Polydispersity D |
|---|---|---|---|
| 0 (= initial value) | 81 000 | 264 000 | 3.2 |
| 0.5 | 77 000 | 177 000 | 2.3 |

TABLE 6-continued

| Sonic irradiation time (h) | Number-average $M_n$ | Weight-average $M_w$ | Polydispersity D |
|---|---|---|---|
| 1 | 70 000 | 158 000 | 2.2 |
| 2 | 76 000 | 147 000 | 1.9 |
| 3 | 71 000 | 134 000 | 1.9 |
| 4 | 72 000 | 125 000 | 1.7 |
| 5 | 68 000 | 119 000 | 1.7 |
| 6 | 66 000 | 112 000 | 1.7 |

Example 7

Circulation Procedure

With apparatus settings identical with those in Example 6 and with configuration identical with that in Example 6, a solution of 5% by weight of polymer was circulated through a continuous-flow reactor. The amplitude setting of the ultrasound source was set to maximum power. The pump-circulation velocity was selected in such a way as to give single-pass average residence time of 1 min in the reaction space. Specimens were taken from the feed vessel at regular time intervals and the progress of the degradation reaction was checked by means of GPC. The results are shown in Table 7.

TABLE 7

| Sonic irradiation time (h) | Number-average $M_n$ | Weight-average $M_w$ | Polydispersity D |
|---|---|---|---|
| 0 (= initial value) | 81 000 | 264 000 | 3.2 |
| 0.75 | 81 000 | 194 000 | 2.4 |
| 2 | 79 000 | 182 000 | 2.3 |
| 3 | 74 000 | 169 000 | 2.3 |
| 4 | 82 000 | 164 000 | 2.0 |
| 5 | 72 000 | 155 000 | 2.2 |
| 6 | 79 000 | 152 000 | 1.9 |
| 7 | 76 000 | 146 000 | 1.9 |

Example 8

Single-Tank Continuous Procedure

With apparatus settings the same as those in Example 1, and using a sonic irradiation temperature of 30° C., a solution of 1% by weight of Therban®3446 was pumped from a feed vessel through a continuous-flow reactor and then separately collected. This type of structure corresponds to a single-tank continuous plant. The pump velocity was selected in such a way as to give a single-pass average residence time of 15 min in the reaction space. The result is shown in Table 8.

TABLE 8

| Sonic irradiation time (h) | Number-average $M_n$ | Weight-average $M_w$ | Polydispersity D |
|---|---|---|---|
| 0 (= initial value) | 81 000 | 264 000 | 3.2 |
| 0.25 | 79 000 | 201 000 | 2.5 |

Example 9

Simulation of a Continuous Procedure with 6 Tanks in Series

With apparatus settings the same as those in Example 1, and using a sonic irradiation temperature of 30° C., a solution of 1% by weight of Therban®3446 was pumped from a feed vessel through a continuous-flow reactor and then separately collected. The resultant solution was again passed through the reactor and homogenized. This procedure was carried out a total of six times. This type of procedure represents a simulation of a 6-tank continuous plant and provides the same residence-time profile of the individual elements of volume. The pump velocity was selected so as to give a single-pass average residence time of 15 min in the reaction space. After each pass, a specimen was taken and characterized by means of GPC. The results are shown in Table 9.

TABLE 9

| Number of cycles | Number-average $M_n$ | Weight-average $M_w$ | Polydispersity D |
|---|---|---|---|
| 0 (= initial value) | 81 000 | 264 000 | 3.2 |
| 1 | 79 000 | 201 000 | 2.5 |
| 2 | 77 000 | 173 000 | 2.2 |
| 3 | 79 000 | 159 000 | 2.0 |
| 4 | 77 000 | 150 000 | 2.0 |
| 5 | 75 000 | 142 000 | 1.9 |
| 6 | 73 000 | 137 000 | 1.9 |

What is claimed is:

1. A process for preparation of a hydrogenated nitrile rubber (B), comprising exposing a solution, in a solvent of a hydrogenated nitrile rubber (A) to the effect of ultrasound, whereupon the resultant hydrogenated nitrile rubber (B) has lower weight-average molecular weight ($M_w$) than the hydrogenated nitrile rubber (A), and the resultant hydrogenated nitrile rubber (B) has a polydispersity $D=M_w/M_n$ which is less than or equal to 2.

2. The process according to claim 1, wherein the hydrogenated nitrile rubber (A) used comprises a hydrogenated co- or terpolymer which contains repeating units of at least one conjugated diene, of at least one α,β-unsaturated nitrile and, optionally, of one or more copolymerizable monomers.

3. The process according to claim 1 or 2, wherein the hydrogenated nitrile rubbers (A) have a weight-average molecular weight $M_w$ in the range from 200,000 to 1,000,000 and also a polydispersity $D=M_w/M_n$ in the range from 1.9 to 8.

4. The process according to claim 1 or 2, wherein the hydrogenated nitrile rubbers (A) have a weight-average molecular weight $M_w$ in the range from 200,000 to 400,000 and also a polydispersity $D=M_w/M_n$ in the range from 2.2 to 5.

5. The process according to claim 1 or 2, wherein the hydrogenated nitrile rubbers (A) have a weight-average molecular weight $M_w$ in the range from 200,000 to 300,000, and also a polydispersity $D=M_w/M_n$ in the range from 2.5 to 4.

6. The process according to claim 1 or 2, wherein ultrasound is used with a frequency of at least 18 kHz.

7. The process according to claim 1 or 2, wherein ultrasound is used with a frequency in the range from 18 to 30 kHz.

8. The process according to claim 1 or 2, wherein ultrasound is used with a frequency in the range from 19 to 25 kHz.

9. The process according to claim 1 or 2, wherein the solvent used for the hydrogenated nitrile rubber (A) comprises dichloromethane, benzene, toluene, cyclohexane or monochlorobenzene.

10. The process according to claim 1 or 2, which is carried out batchwise or continuously.

11. The process according to claim 1 or 2, which is carried out at a temperature in the range from −30 to 100° C.

* * * * *